(12) United States Patent
Wehner et al.

(10) Patent No.: US 7,502,165 B2
(45) Date of Patent: Mar. 10, 2009

(54) ARRANGEMENT FOR REGULATING THE TEMPERATURE OF THE SAMPLE SPACE OF A MICROSCOPE

(75) Inventors: Eugen Wehner, Goettingen (DE); Joerg Schaffer, Goettingen (DE); Werner Kleinschmidt, Adelebsen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 11/828,617

(22) Filed: Jul. 26, 2007

(65) Prior Publication Data

US 2008/0024861 A1 Jan. 31, 2008

(30) Foreign Application Priority Data

Jul. 26, 2006 (DE) .................. 10 2006 034 534

(51) Int. Cl.
*G02B 21/26* (2006.01)
(52) U.S. Cl. ........................ 359/395; 359/391
(58) Field of Classification Search ......... 359/368–396, 359/820
See application file for complete search history.

(56) References Cited

U.S. PATENT DOCUMENTS 3,343,018 A    9/1967  Balamuth et al. ............. 310/26
5,343,018 A *  8/1994  Limbach ..................... 219/200
5,410,429 A    4/1995  Focht .......................... 359/395
6,493,135 B1 * 12/2002  Engelhardt ................. 359/395
2006/0092506 A1 * 5/2006  Tsuchiya et al. ............ 359/395
2006/0113488 A1 * 6/2006  Motoi ..................... 250/492.21

FOREIGN PATENT DOCUMENTS

| DE | 199 06 762 |   | 8/2000 |
| JP | 61-177413  | * | 8/1986 |
| JP | 11-38326   |   | 2/1999 |
| WO | 98/37749   |   | 9/1998 |

* cited by examiner

*Primary Examiner*—Thong Nguyen
(74) *Attorney, Agent, or Firm*—Reed Smith LLP

(57) ABSTRACT

The invention is directed to an arrangement for regulating the temperature of the sample space of a microscope, preferably for observing cells (live cell imaging) with an objective turret carrying objectives, a sample holder serving to receive a sample, a heating or cooling insert with an incubator hood for managing the temperature of the sample holder, and an objective heating element or objective cooling element. According to the invention, at least one structural component part which blocks the heating flow or cooling flow is provided between the objective heating element or objective cooling element and the objective turret.

14 Claims, 4 Drawing Sheets

ARRANGEMENT FOR REGULATING THE TEMPERATURE OF THE SAMPLE SPACE OF A MICROSCOPE

CROSS-REFERENCE TO RELATED APPLICATIONS

This application claims priority of German Application No. 10 2006 034 534.7, filed Jul. 26, 2006, the complete disclosure of which is hereby incorporated by reference.

BACKGROUND OF THE INVENTION a) Field of the Invention

The invention is directed to an arrangement for regulating the temperature of the sample space of a microscope, preferably for observing living cells (live cell imaging) with an objective turret carrying objectives, a sample holder serving to receive a sample, a heating or cooling insert with an incubator hood for managing the temperature of the sample holder, and an objective heating element or objective cooling element.

b) Description of the Related Art

In microscopic examination of living cells or tissue portions, it is increasingly required to adjust the specific living conditions of the specimen. Apart from taking into account the relative air humidity and the $CO_2$ (carbon dioxide) content, this also includes regulating the temperature.

A known solution for keeping the temperature relatively constant is to use a heatable microscope stage. Different holder frames make it possible to adapt to all common sample receptacles. For example, if very low temperatures are required, the use of a temperature-controllable microscope stage in combination with a low-temperature controller is recommended.

Another known possibility for regulating temperature is carried out by means of a heated or cooled air flow which blows past the sample within a closed system (incubator) on the microscope and, together with the heatable or coolable microscope stage or a heating insert or cooling insert, supplies the required temperature for the sample.

An additional improvement in the temperature value in the observation area is achieved through the use of objective heating elements or objective cooling elements which are either connected directly to the objective or which supply heat or cold to the objective jacket in the form of an air flow. The objectives pass the temperature on to the sample via an immersion medium and the glass.

EP 1 051 064 B1, for example, describes a microscope in which the temperature of all of the objectives carried by the objective turret can be regulated simultaneously by a device which is arranged at the objective turret. Heating elements and cooling elements are provided for this purpose.

Another variant for heating objectives is shown in U.S. Pat. No. 5,410,429. In this case, the objective is heated in a defined manner by a heating loop which is placed around the objective jacket.

U.S. Pat. No. 3,343,018 describes electric objective heating elements which are integrated in the objective housing in the form of sleeves, for example.

All of the known solutions have the disadvantage that the amount of heat or cold which flows off in the areas remote of the front lens and even in the objective turret is so large that it is impossible to maintain a desired temperature or temperature constancy at the sample location without a very high expenditure with respect to the arrangement and regulating resources. Further, the thermal mass of the elements is very large so that a large amount of energy and time is required for changing the temperature.

OBJECT AND SUMMARY OF THE INVENTION

In view of this disadvantage, it is the primary object of the invention to further develop an arrangement for regulating the temperature of the sample space of a microscope in such a way that, without a large expenditure on the arrangement, the desired temperature is reached at the front lens of the objective and remains constant. This is a requirement for an optimum temperature at the sample location. It is another object of the invention to reduce the thermal mass of the elements in such a way that it is possible to effect desired changes in temperature at the sample location.

According to the invention, this object is met by an arrangement for regulating the temperature of the sample space at a microscope of the type described above in that at least one structural component part which blocks the heating flow or cooling flow is arranged between the objective heating element or objective cooling element and the objective turret and is advantageously constructed as a self-enclosed insulating ring comprising a material having almost no thermal conductivity.

DESCRIPTION OF THE PREFERRED EMBODIMENTS

Figure 1:
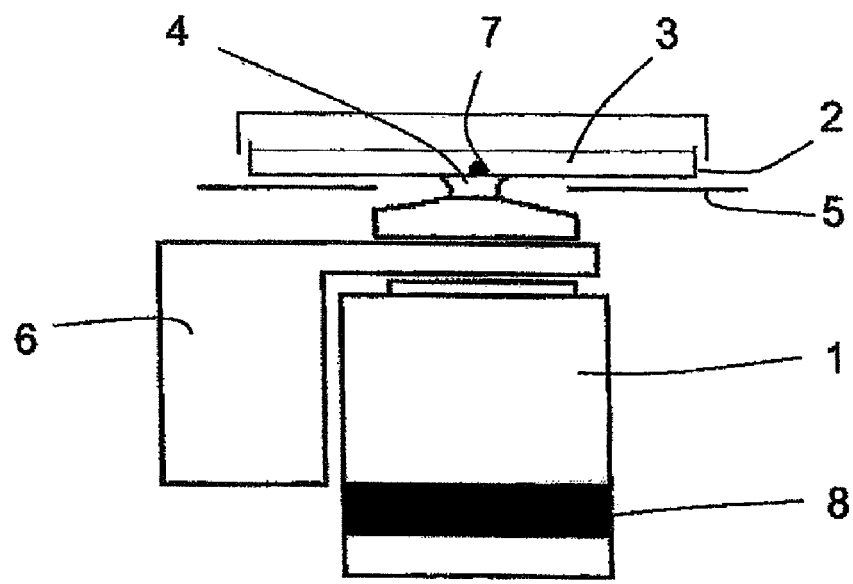
FIG. 1 is a schematic view of the individual components for maintaining the temperature ratios.

As stated above, the invention comprises an arrangement for regulating the temperature of the sample space at a microscope of the type described above in that at least one structural component part which blocks the heating flow or cooling flow is arranged between the objective heating element or objective cooling element and the objective turret and is advantageously constructed as a self-enclosed insulating ring comprising a material having almost no thermal conductivity.

The arrangement can be used in both upright and inverted microscopes. It is irrelevant whether the flow to be blocked is a heating flow or a cooling flow.

As a result of the arrangement of the structural component part blocking the heating flow or cooling flow, the heating flow or cooling flow generated by the objective heating element or objective cooling element is interrupted by the objective in the objective turret. The desired temperature at the front lens of the objective and, therefore, in the area of the sample is reached without difficulty and also remains constant because the generated temperature is practically not conducted off via other elements and lost.

In a preferred constructional variant, the insulating ring is located in the wall of the cylindrical optics carrier as close as possible to the front lens. In this way, only a small amount of the material of the objective need be heated or cooled.

All of the constructional variants are wherein the temperature ratios in the sample area are substantially improved by using smaller incubators. The arrangement of relatively large incubators which comprise, for example, the object stage, the objectives, the condenser, and the illumination arm and which therefore limit free access can be dispensed with.

By means of the arrangement according to the invention, it is possible for the first time to carry out live cell examinations based on the desired temperature, also with a small incubator resting, for example, on the heating insert or cooling insert, so that substantially more valid results are reached.

Due to the drastic reduction in the temperature difference between the front lens of the objective and the heated objective region, the stresses normally occurring within the objective which can lead to material fatigue, for example, are sharply reduced. Since it is sufficient to supply less heat compared to conventional solutions, there is also less of an adverse effect on the cement substances that are used or on the optical characteristics of the objective itself.

The width of the insulating ring substantially depends on the material that is used and should lie within the range of 3 mm and 7 mm. However, this range is only a guideline because it depends not only on the material but also on the dimensions of the optics carrier or the optics carrier mount.

It is useful when the insulating ring is a component part of the wall of the cylindrical optics carrier and is located as close as possible to the front lens. In this way, as little heat or cold as possible is carried off through the objective.

In addition to the arrangement of the insulating ring in the optics carrier, it is also possible to arrange it in the optics carrier mount.

It is also possible for the insulating ring to be formed by the thread provided at the objective turret for receiving the optics carrier mount or by the thread of the optics carrier mount itself.

Another conceivable embodiment form consists in that the structural component part blocking the heating flow or cooling flow is formed as individual webs instead of as a self-enclosed insulating ring. However, the interruptions between the webs behave like temperature bridges and should therefore be kept to a minimum.

In other possible configurations for blocking the heating flow or cooling flow, the insulating ring, instead of making up the entire thickness of the optics carrier or optics carrier mount, is either integrated circumferentially in a cutout incorporated in the wall or is located in the interior of the wall, for example, in a groove inserted therein. The optics carrier and the optics carrier mount can both be manufactured from conventional standard material in these cases.

Various constructional variants are possible such as, for example, that a plurality of structural component parts blocking the heating flow or cooling flow are integrated in the wall of the optics carrier and/or in the wall of the optics carrier mount and/or in the threaded portions of the receiving thread of the optics carrier mount and/or of the receiving thread of the objective turret.

Also conceivable is an advantageous further development in which the structural component part blocking the heating flow or cooling flow is the entire optics carrier and/or the entire optics carrier mount. This has the advantage that no additional contours or media are required for connecting the structural component part to parts of the optics carrier or optics carrier mount.

Contours of the type mentioned above could be, for example, threads which are formed at the cylinder of the optics carrier or at the optics carrier mount for receiving the structural component part which is provided with the counter-contour and which blocks the heating flow or cooling flow (adapter incorporated within the objective).

The structural component part blocking the heating flow or cooling flow is advantageously made of a material with an extremely low thermal conductance, for example, as in an advantageous construction, TEDUR having a thermal conductance of 0.25 W/Km.

Similarly conceivable is a development where the structural component part blocking heating flow or cooling flow is constructed as a detachable adapter. In such an arrangement, the connection between the element blocking the heating flow or cooling flow and the adapter could be a threaded coupling.

The invention will be described in the following by way of example with reference to the drawings.

FIG. 1 shows an embodiment example of the arrangement according to the invention for regulating the temperature of the sample space of a microscope with an inverted microscope body comprising an objective 1 and a sample holder 2 in the form of a Petri dish containing the culture medium 3 in which a sample is to be embedded. The front lens of the objective 1 which is not shown in more detail in FIG. 1 communicates with the sample holder 2 by an immersion liquid 4.

A heating insert 5 and a heating element 6 which is directly connected to the objective 1 are provided to maintain defined temperature ratios in the sample space. The heating insert 5 and also the amount of heat to be given off by the objective heating element 6 can be controlled by a temperature sensor 7 which is located in the immediate vicinity of the sample to be investigated and by a regulating device, not shown in more detail.

According to the invention, an insulating ring 8 is located in the objective 1 for the purpose of blocking the heating flow—or cooling flow—given off in the direction of the objective turret 14 by the objective heating element 6 in such a way that the desired temperature can easily be reached in the sample area and remains virtually constant.

When brass with a thermal conductance of 195 W/Km is used for the mount of the optics carrier, an insulting ring of TEDUR with a thermal conductance of 0.25 W/Km and a width of 7 mm is used in the present embodiment example. In the present embodiment example, the insulating ring 8 is constructed as a closed ring, although it could also conceivably be constructed as an open ring.

FIGS. 2 to 5 show different embodiment examples of the arrangement of the insulating ring. The microscope objective 1 is shown schematically in all of the FIGS. 2 to 5 with its optics carrier 9, a lens system 10, a front lens 11, an optics carrier mount 12 with its receiving thread 13, and an objective turret 14 with its receiving thread 15.

Figure 2:
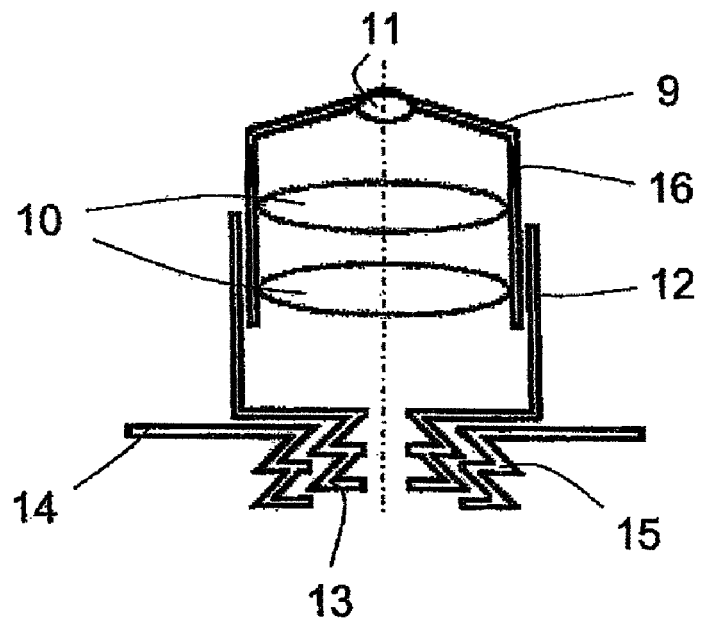
FIG. 2 shows a microscope objective with an insulating ring in the optics carrier.

FIG. 2 shows the arrangement of an insulating ring 16 in the wall of the optics carrier 9 in the immediate vicinity of the front lens 11, i.e., immediately behind the objective heating element 6 (FIG. 1). This arrangement of the insulating ring 16 has the advantage that only a very small supply of heat or cold is needed to reach the desired temperature.

Figure 3:
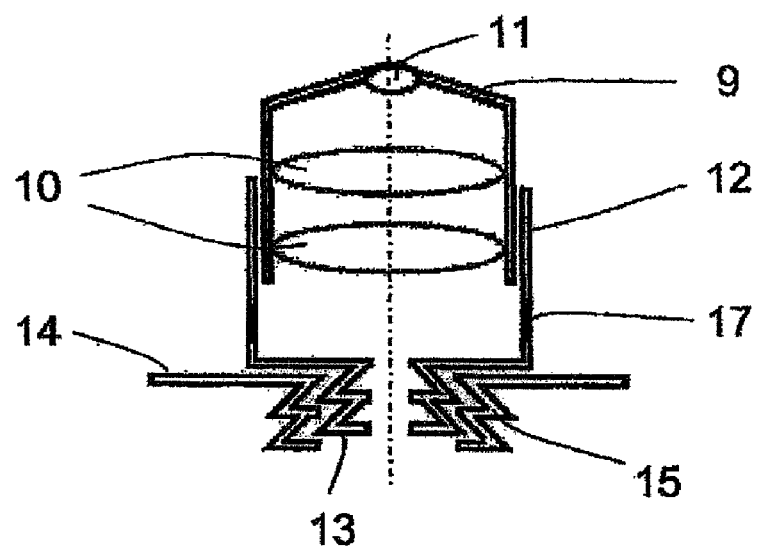
FIG. 3 shows a microscope objective with an insulating ring in the optics carrier mount.
Figure 4:
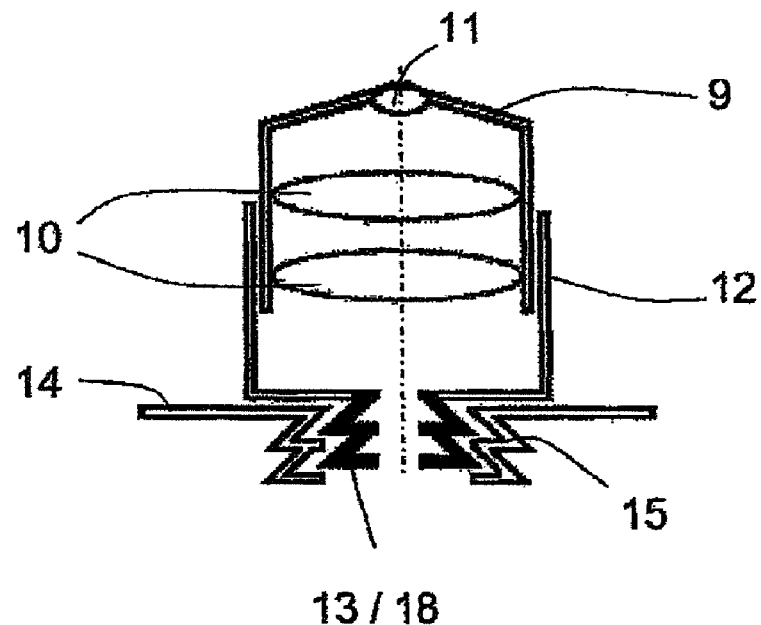
FIG. 4 shows a microscope objective with an insulating thread.
Figure 5:
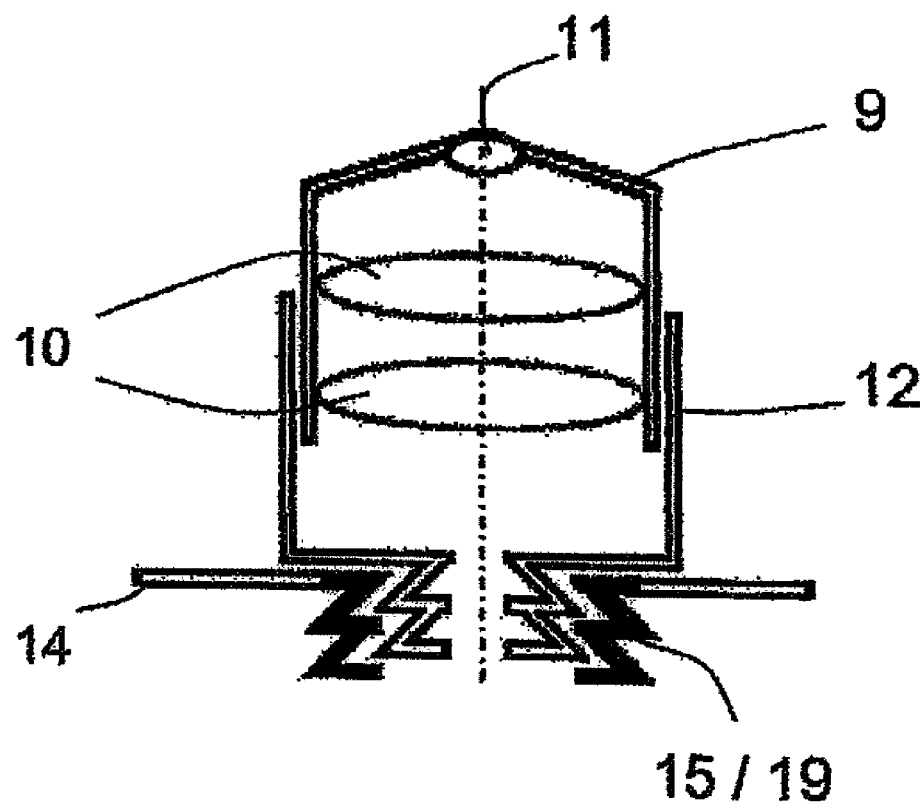
FIG. 5 is a schematic view of a heating flow or cooling flow blocked by the receiving thread of the objective turret.

FIG. 3 shows the arrangement of an insulating ring 17 in the optics carrier mount 12. Other alternative solutions are shown in FIGS. 4 and 5. While an insulating ring 18 in FIG. 4 comprises the receiving thread 13 of the optics carrier mount 12, an insulating ring 15 in FIG. 5 is formed by the receiving thread 19 of the objective turret 14.

Variants in which either the optics carrier 9 or the optics carrier mount 12 are made entirely of the material blocking the heating flow or cooling flow are also conceivable.

Figure 6:
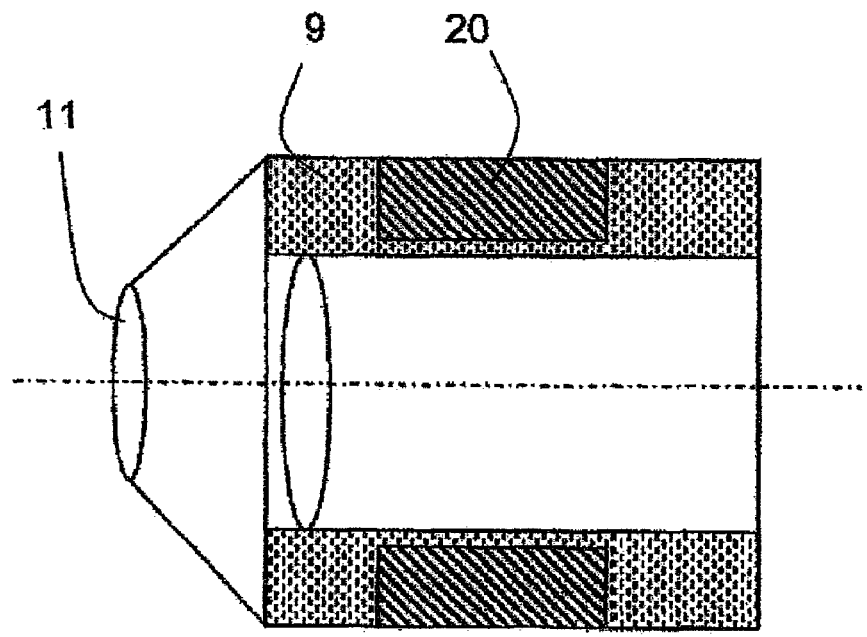
FIG. 6 shows the arrangement of the insulating ring in the outer contour of the wall of the optics carrier.

FIG. 6 schematically shows an embodiment form in which an insulating ring 20 is integrated in a cutout of the wall of the optics carrier 9. It is also conceivable to integrate the insulating ring in the optics carrier mount 12 in like manner. In this case, while the heating flow or cooling flow is blocked less than when the insulating ring 20 fully divides the wall, the advantage consists in that these variants are simpler to implement in technical respects relating to manufacture.

Figure 7:
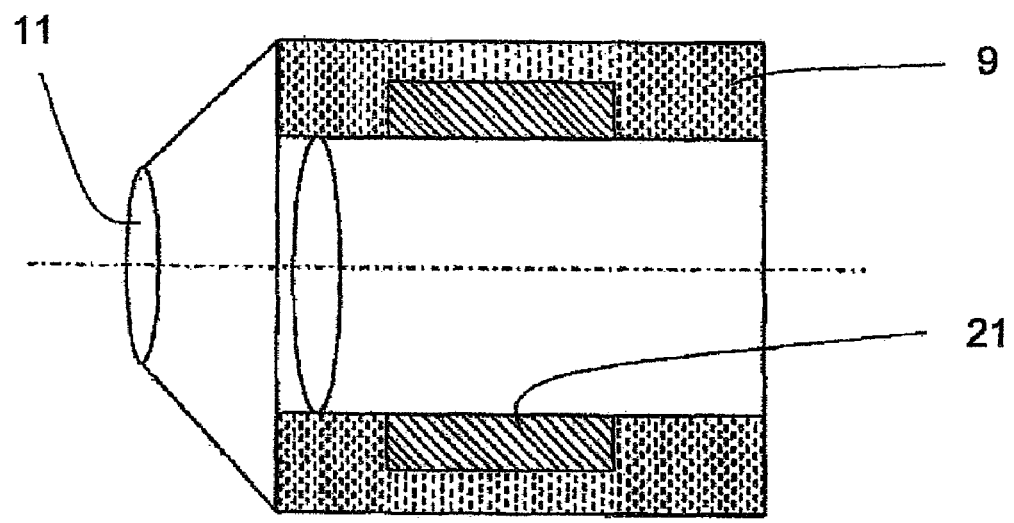
FIG. 7 shows the arrangement of the insulating ring in the inner contour of the wall of the optics carrier.

This also applies to the shape shown in FIG. 7 in which an insulating ring 21 is received in the inner cylinder of the optics carrier 9.

While the foregoing description and drawings represent the present invention, it will be obvious to those skilled in the art that various changes may be made therein without departing from the true spirit and scope of the present invention.

REFERENCE NUMBERS 1 objective
2 sample holder
3 culture medium
4 immersion liquid
5 heating insert
6 objective heating element
7 temperature sensor
8, 16, 17, 18, 19, 20, 21 insulating ring
9 optics carrier
10 lens system
11 front lens
12 optics carrier mount
13, 15 receiving thread
14 objective turret

What is claimed is:

1. An arrangement for regulating the temperature of a sample space of a microscope, comprising:
    an objective turret carrying objectives;
    a sample holder serving to receive a sample;
    a heating or cooling insert for managing the temperature of the sample holder;
    an objective heating element or objective cooling element; and
    at least one structural component part which blocks a heating flow or cooling flow is provided between the objective heating element or objective cooling element and the objective turret.

2. The arrangement for regulating the temperature of a sample space of a microscope according to claim 1, wherein the structural component part which blocks the heating flow or cooling flow is an insulating ring.

3. The arrangement for regulating the temperature of a sample space of a microscope according to claim 2, wherein the insulating ring is constructed so as to be self-enclosed.

4. The arrangement for regulating the temperature of a sample space of a microscope according to claim 2, wherein the width of the insulating ring depends on the material that is used for the insulating ring and is between 3 mm and 7 mm.

5. The arrangement for regulating the temperature of a sample space of a microscope according to claim 2, wherein the insulating ring is a component part of a wall of the cylindrical optics carrier and is located behind a front lens.

6. The arrangement for regulating the temperature of a sample space of a microscope according to claim 2, wherein the insulating ring is integrated in a cylindrical optics carrier mount.

7. The arrangement for regulating the temperature of a sample space of a microscope according to claim 6, wherein the insulating ring is in the wall of the cylindrical optics carrier mount.

8. The arrangement for regulating the temperature of a sample space of a microscope according to claim 6, wherein a receiving thread provided at the optics carrier mount for fixing in the objective turret is constructed as insulating ring.

9. The arrangement for regulating the temperature of a sample space of a microscope according to claim 1, wherein a receiving thread provided at the objective turret for receiving an optics carrier mount is constructed as insulating ring.

10. The arrangement for regulating the temperature of a sample space of a microscope according to claim 1, wherein a plurality of structural component parts blocking the heating flow or cooling flow are integrated in the wall of an optics carrier and/or in the wall of an optics carrier mount and/or in threaded portions of receiving threads of the optics carrier mount and/or of the objective turret.

11. The arrangement for regulating the temperature of a sample space of a microscope according to claim 1, wherein the structural component part blocking the heating flow or cooling flow is an optics carrier and/or an optics carrier mount.

12. The arrangement for regulating the temperature of a sample space of a microscope according to claim 1, wherein the structural component part which blocks the heating flow or cooling flow comprises a material with an extremely low thermal conductance.

13. The arrangement for regulating the temperature of a sample space of a microscope according to claim 12, wherein the structural component part which blocks the heating flow or cooling flow is made of TEDUR with a thermal conductance of 0.25 W/Km.

14. The arrangement for regulating the temperature of a sample space of a microscope according to claim 1, wherein a temperature sensor is provided in the sample space.

* * * * *